United States Patent Office 3,526,442
Patented Sept. 1, 1970

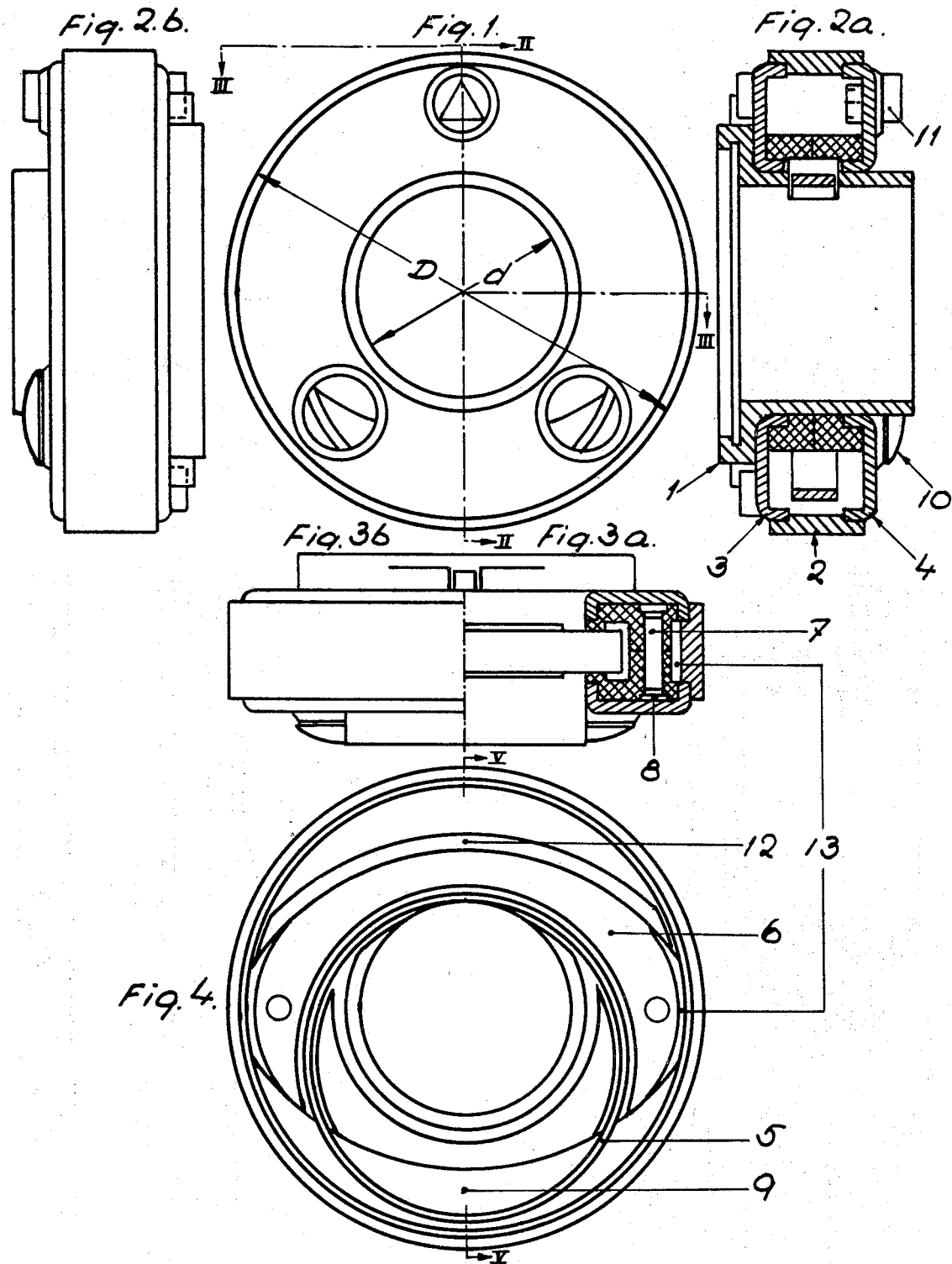

3,526,442
RING BEARING
Gerdt Winlöf, 18A von Boijgatan, Laxa, Sweden
Filed Sept. 17, 1968, Ser. No. 760,147
Int. Cl. F16c 1/24
U.S. Cl. 308—128                                5 Claims

ABSTRACT OF THE DISCLOSURE

A sleeve bearing defined by a sleeve and holder with a U-shaped profile providing an endless annular chamber between the sleeve and holder containing means for lubricating the sleeve surface and a space for lubricant with inspecting windows.

BACKGROUND OF THE INVENTION

This invention relates to sleeve bearings.

With regard to the function thereof, machine bearings are divided in two groups namely roller bearings and sleeve bearings. The machine designer's choice on which bearings to employ in a certain case, is dependent on the character of the loadings. The bearings carry a rotating machine shaft, which is loaded with forces, which are different in position and size. If these forces are constant, or vary within narrow limits and no special claims on silent running exist, the choice will be a convenient roller bearing, whose life can be estimated, and judged as acceptable. A machine shaft transmits a certain power to another rotating element. In physical terms, this power is equal to a product of torque and revolution, and which are given by means of the function of the machine. If a slow revolution is to be used, the torque will be higher and the forces on the bearing greater and these circumstances determine the use of the roller bearings. The contact between the tracks and the rollers is a point or a line and the pressure on the surface may rise so high that the elastic limit will be overstepped with the resultant disastrous consequences.

The general experience is that this is the situation when the forces are vibrating or shocking and the choice in this case is a sleeve bearing made by the machine manufacturer. The ability of sleeve bearings to carry heavy loads is excellent since the specific pressure will be less between the shaft and sleeve, which are maintained apart with a film of oil of the proper quality. A hydrodynamic slide friction develops which leaves the surfaces of the shaft and the sleeve free of contact and damage. It has long been desired that sleeve bearings could be readily available for purchase as a commercial product along the lines of roller bearings. Different proposals for the solution of this problem have been made, but such proposals have been unsuccessful due to lubricating difficulties. Experience has demonstrated that the lubricant must be moved to and off the surface of the shaft and the sleeve, and during this circular movement be cooled and protected against impurities.

SUMMARY OF THE INVENTION

The main object of this invention is to provide a solution for this problem which is achieved by the following:

High resistance against vibrating or shocking forces.
Silent running.
The oil must be cleaned by means of a filter, which is achieved when new oil is supplied to the oil chamber via the inlet.
Continuous oil circulation, oil chamber—surface—(oil chamber) by means of a lubricating ring.
Guiding block, with a channel for the lubricating ring.
The diametric dimensions of the ring bearing must be the same as corresponding roller bearing.
Inspection windows for control of the oil level and the function of the lubricating ring.
Oil tight performance.
Friction heat will be drawn off.

BRIEF DESCRIPTION OF THE DRAWINGS

In the drawings:

FIG. 1 is a front elevational view of a ring bearing according to the invention, FIG. 2a is a view taken along the line II—II in FIG. 1, the view looking in the direction of the arrows, FIG. 2b is a side elevational view of the ring bearing, FIG. 3a is a view taken along the line III—III in FIG. 1, the view looking in the direction of the arrows, FIG. 3b is a plan view of the ring bearing.

FIG. 4 is a view taken along the line IV—IV in FIG. 5, the view looking in the direction of the arrows and showing the interior of the ring bearing

DETAILED DESCRIPTION OF THE INVENTION

Figure 5:
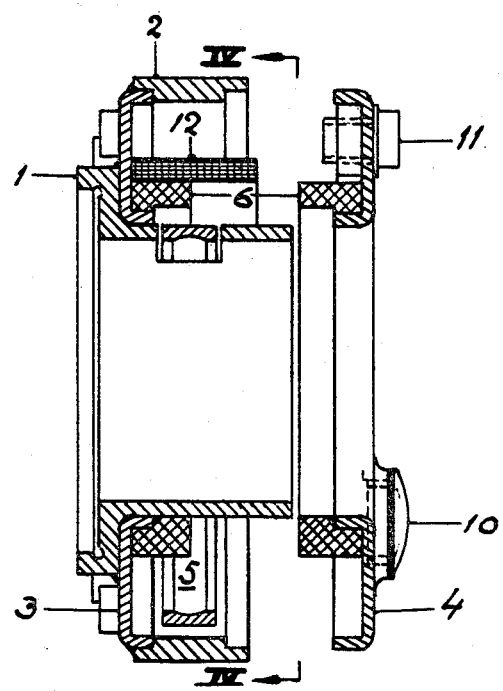
FIG. 5 is a view taken along the line V—V in FIG. 4 during the assembly of the ring bearing, the view looking in the direction of the arrows.

With reference to the drawing, it will be seen that the present bearing includes a sleeve 1, which is positioned into a holder defined by a front bracket 4, rear bracket 3 and a support ring 2. The ring 2 provides the cylindrical part of the holder which limits the space so that it will be tight against oil leakage, by means of shrink fit. The upper part of the sleeve bearing is formed with an opening 10 in which a lubricating ring 5 runs, thereby bringing oil from an oil chamber $a$ when the machine shaft rotates. The lubricating ring 5 will pass a channel $c$, which is defined when two similar parts 6a, 6b of a guiding block 6 are positioned in operative relationship as illustrated in FIG. 2a. The effect is that the lubricating ring 5 will be guided in the channel, so that contact with the machine shaft remains.

The parts constituting the guiding block 6 may be of a non-metallic material, such as polyamido plastic or the equivalent, which eliminates a tinkling noise, which otherwise may arise. The guiding blocks are held in the right position by means of two guiding pins 7 and towards the brackets by two guiding studs 8 in the same as best shown in FIG. 3a. In order to control the oil level in the oil chamber $a$ and the function of the lubricating ring 5, two windows of plexi-glass or similar material, cover inspection openings 10 in the lower part of the front bracket 4. For refilling with oil, the upper part of the front bracket 4 is provided with a refill opening 11 having a closing-device and filter 12 is arranged within this bracket for preventing impurities in the oil entering the oil chamber.

The bearing sleeve 1 is of bronze, consisting of copper, tin and lead and the slide surface is overcoated with babbit. All surfaces are turned in a lathe to the final size, prior to assemblage to the entire ring bearing.

The supporting ring 2 is of bronze and is turned in an automatic turret lathe while the rear bracket 3 and front bracket 4 are of brass, consisting of copper, zinc and lead and produced in a casting machine with the circular edges being turned off and the holes reamed to final size.

The lubricating ring 5 is of steel and turned in a lathe with the guiding block 6 being of a nonmetallic material.

The guiding pins 7 are of brass and the guiding studs 8 cast as parts of the rear and front brackets.

The oil chamber 9 is a space in the lowest part of the bearing in which the lubricating ring is immersed in oil and the inspection windows 10 are two openings at the same level as the oil chamber.

The refill opening 11 is used when the bearing is assembled to the machine.

The oil will flow through oil filter 12 and the oil passage 13 and will be taken up in the oil chamber. The L-shaped joints, which are between the brackets 3 and 4 and the bearing sleeeve 1 and the brackets and the support ring 2, will be filled with pure tin. As a last procedure, a finish grinding of the cylindrical surfaces on the support ring will be effected to center it to the cylindrical surfaces of the bearing sleeve. The ring bearing is then sealed and forms a complete, firm and finished unit.

What I claim is:

1. In a sleeve bearing for a machine shaft, a bearing sleeve for centering the shaft, united front and rear brackets and a ring constituting a supporting means for receiving the strains from the shaft operably related to the bearing sleeve and having an annular chamber therein for containing a lubricant, lubricating means operable within the annular chamber for conveying lubricant from the chamber to the surface of the bearing sleeve and to the chamber, said front bracket having at least one window for inspection of the annual chamber and the lubricant therein and a refill opening for lubricant, and an oil filter within the annular chamber behind the refill opening.

2. The sleeve bearing as claimed in claim 1 in which the inner and outer diameters of the bearing as for corresponding standardized roller bearings.

3. In a sleeve bearing for a machine shaft, a bearing sleeve for centering the shaft, united front and rear brackets and a ring constituting a supporting means for receiving the strains from the shaft operably related to the sleeve and having an annular chamber therein for containing a lubricant, a guiding block of nonmetallic material located between said brackets and provided with an annular channel, a lubricating ring received in the annular channel for applying lubricant from the chamber to the surface of the sleeve, said front bracket having at least one window for inspection of the annular chamber and the lubricant therein and a refill opening for lubricant and an oil filter within the annular chamber behind the refill opening.

4. The sleeve bearing as claimed in claim 3 in which said bearing block is defined by two identical components and guide pins holding said components together.

5. The sleeve bearing as claimed in claim 4 in which said window and refill opening are located in the lower and upper parts of the front bracket.

References Cited

UNITED STATES PATENTS

| | | | |
|---|---|---|---|
| 1,673,700 | 6/1928 | Nilsson | 308—128 |
| 1,683,608 | 9/1928 | Doun et al. | 308—128 |
| 1,991,622 | 2/1935 | Okenfuss | 308—128 |

FOREIGN PATENTS

| | | |
|---|---|---|
| 870,663 | 6/1961 | Great Britain. |

FRED C. MATTERN, JR., Primary Examiner

F. SUSKO, Assistant Examiner